(12) United States Patent
Zhao et al.

(10) Patent No.: US 11,620,345 B2
(45) Date of Patent: Apr. 4, 2023

(54) METHOD AND APPARATUS FOR A MECHANISM FOR EVENT REPLAY WHEN A REROUTE OF RECORDATION OF THE EVENT OCCURRED IN A MULTIPLEXED EVENT RECORDATION SYSTEM

(71) Applicant: Salesforce, Inc., San Francisco, CA (US)

(72) Inventors: Yingwu Zhao, Lafayette, CA (US); Hal Scott Hildebrand, Moss Beach, CA (US)

(73) Assignee: Salesforce, Inc., San Francisco, CA (US)

( * ) Notice: Subject to any disclaimer, the term of this patent is extended or adjusted under 35 U.S.C. 154(b) by 508 days.

(21) Appl. No.: 16/203,544

(22) Filed: Nov. 28, 2018

(65) Prior Publication Data

US 2020/0097503 A1    Mar. 26, 2020

Related U.S. Application Data

(60) Provisional application No. 62/735,796, filed on Sep. 24, 2018.

(51) Int. Cl.
*G06F 16/90* (2019.01)
*G06F 9/54* (2006.01)
(Continued)

(52) U.S. Cl.
CPC ......... *G06F 16/907* (2019.01); *G06F 9/542* (2013.01); *G06F 16/90348* (2019.01)

(58) Field of Classification Search
None
See application file for complete search history.

(56) References Cited

U.S. PATENT DOCUMENTS 7,680,951 B1 *  3/2010  Kulik ............... H04L 45/306
                                         709/238
7,730,478 B2   6/2010  Weissman
(Continued)

OTHER PUBLICATIONS

Sookocheff, Kevin, "Kafka in a Nutshell", retrieved from the Internet on Sep. 17, 2018: https://sookocheff.com/post/kafka/kafka-in-a-nutshell/, Sep. 25, 2015, 22 pages.

*Primary Examiner* — Ashish Thomas
*Assistant Examiner* — Raheem Hoffler
(74) *Attorney, Agent, or Firm* — Nicholson, De Vos, Webster & Elliott, LLP

(57) ABSTRACT

A method for enabling event consumption is described. Upon receipt of a request for events associated with a first initial topic, a determination that the request includes a request for historical events is performed. Responsive to determining that one or more rules apply to the request for historical events, a determination of a first path from the first initial topic to a first aggregate topic is performed based on the one or more rules. The first path is different from a second path from the first initial topic to a second aggregate topic that is defined according to a current multiplexed framework definition. The current multiplexed framework definition is used for storing new events associated with the first initial topic in a second multiplexed event recordation system at a time that follows the time of receipt of the request. A first set of historical events is retrieved based on the first path.

18 Claims, 8 Drawing Sheets

(51) Int. Cl.
*G06F 16/907* (2019.01)
*G06F 16/903* (2019.01)

(56) References Cited

U.S. PATENT DOCUMENTS

| | | | |
|---|---|---|---|
| 7,804,856 B2* | 9/2010 | Krause | H04L 29/06027 370/486 |
| 8,270,310 B2* | 9/2012 | Raleigh | H04L 63/10 709/225 |
| 9,542,118 B1* | 1/2017 | Lercari | G06F 3/0688 |
| 10,262,032 B2 | 4/2019 | Zhao | |
| 10,409,650 B2 | 9/2019 | Zhao et al. | |
| 10,652,304 B1* | 5/2020 | Nielsen | H04L 65/607 |
| 10,776,825 B2 | 9/2020 | Zhao et al. | |
| 10,853,372 B1* | 12/2020 | Mueen | G06F 16/24568 |
| 11,151,125 B1* | 10/2021 | Dwivedi | G06F 16/248 |
| 2003/0200022 A1* | 10/2003 | Streichsbier | F02D 41/28 701/108 |
| 2004/0019667 A1* | 1/2004 | Slemmer | G06F 9/542 709/223 |
| 2011/0307433 A1* | 12/2011 | Dlugosch | G06F 9/544 706/45 |
| 2014/0019986 A1* | 1/2014 | Reis | G06F 16/176 718/102 |
| 2014/0195622 A1* | 7/2014 | Cullen | H04L 51/046 709/206 |
| 2015/0207857 A1* | 7/2015 | Horton | H04L 67/16 709/204 |
| 2015/0370882 A1* | 12/2015 | Kalki | G06F 16/9027 707/600 |
| 2017/0083386 A1* | 3/2017 | Wing | G06Q 10/10 |
| 2017/0155703 A1* | 6/2017 | Hao | H04L 67/12 |
| 2018/0039513 A1 | 2/2018 | Zhao | |
| 2018/0351781 A1* | 12/2018 | Movsisyan | H04L 67/02 |
| 2019/0058660 A1* | 2/2019 | Ruiz-Meraz | H04L 51/24 |
| 2019/0095510 A1* | 3/2019 | Cruise | G06F 16/24568 |
| 2019/0166177 A1 | 5/2019 | Zhao | |
| 2019/0324431 A1* | 10/2019 | Cella | G06N 20/00 |
| 2020/0329091 A1* | 10/2020 | Movsisyan | H04L 67/10 |
| 2022/0171755 A1* | 6/2022 | Zenger | G06F 16/24568 |

* cited by examiner

METHOD AND APPARATUS FOR A MECHANISM FOR EVENT REPLAY WHEN A REROUTE OF RECORDATION OF THE EVENT OCCURRED IN A MULTIPLEXED EVENT RECORDATION SYSTEM

CROSS-REFERENCE TO RELATED APPLICATIONS

This application claims the benefit of U.S. Provisional Application No. 62/735,796, filed Sep. 24, 2018, which is hereby incorporated by reference.

TECHNICAL FIELD

One or more implementations relate to the field of event recordation and replay systems; and more specifically, to a mechanism of event replay when a reroute of recordation of the event occurred in a multiplexed event recordation system.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience.

The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

The problem exists of retrieving and replaying the data efficiently from one or more event recordation systems.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
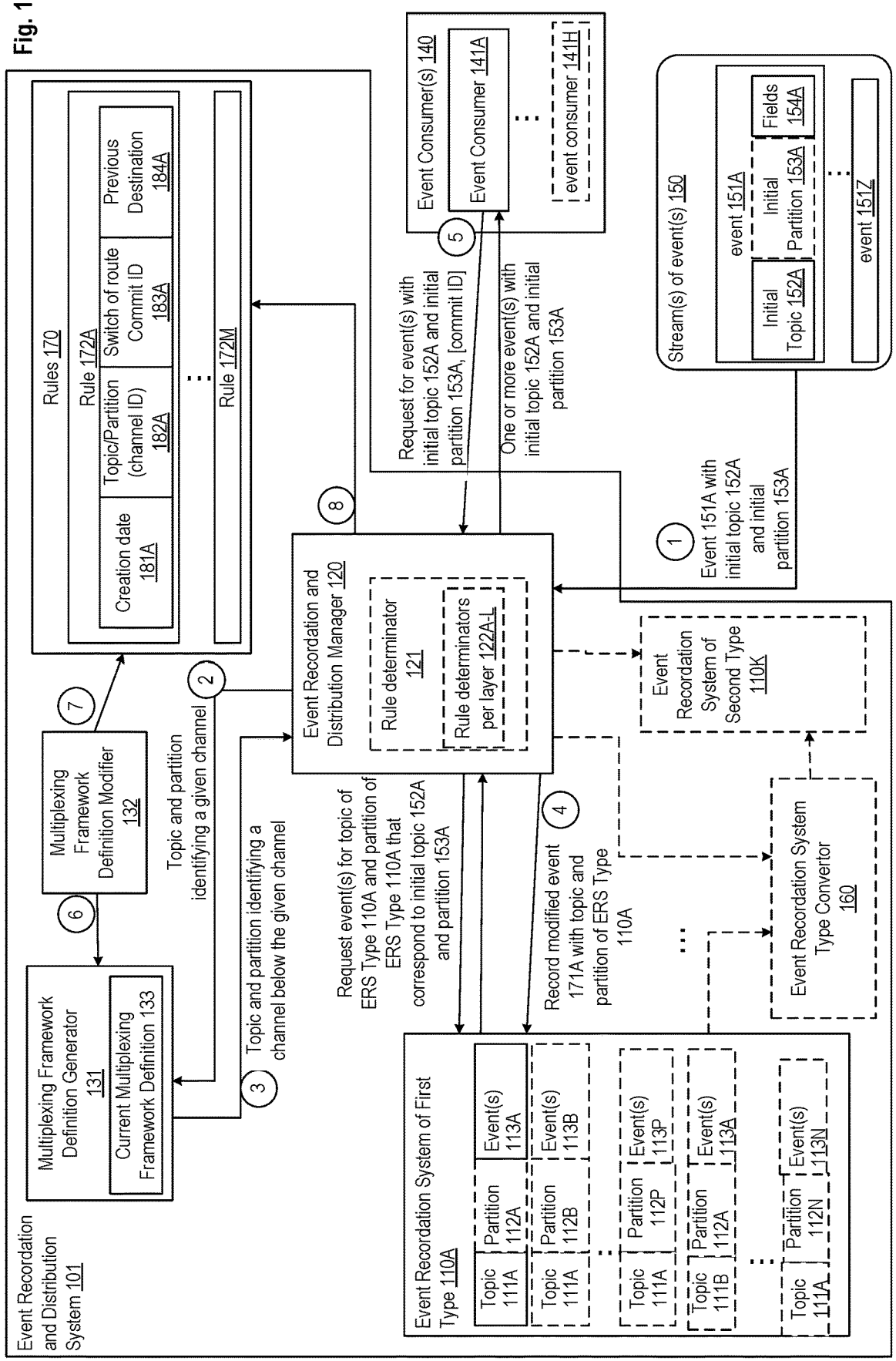
FIG. 1 illustrates a block diagram of a system for handling personal data in logs according to one implementation.

An event is an identifiable unit of data that conveys information about operations that occur in a system (e.g., measurements recorded in an IoT device, actions performed by a user of a social networking system, failures of an operation or a system, etc.). Events can be user-generated or system-generated. In some implementations, an event is associated with an initial partition and an initial topic. A topic can be information or details on the event that can be used to group one or more events. In a similar manner, the partition can be information on the event, which can be used to group multiple events. The partition and topic can be used to aggregate stream of events with the same topic and partition and can be used to transmit these events to one or more consumers that requests them based on the partition and topic they are associated with. In a non-limiting example, of a multi-tenant platform, the initial partition can be an organization identifier (org_ID) where each one of the org_IDs uniquely identifies a tenant within the system, and the initial topic can be a word or alphanumerical value added to a record generated in the system. Other examples of topics or partitions can be contemplated without departing from the scope of the present implementations.

A huge challenge for platforms using event recordation systems (e.g., enterprise platforms) is to be able to replay specific events from the massive quantity of events that are stored/persisted from millions of IoT devices and/or applications. In particular, this problem becomes more complex in some implementations, where event recordation systems are not conceived to support a large scale of users, organizations, and/or devices and the events are multiplexed based on a multiplexing framework that results in the event being recorded in the event recordation system based on a partition and topic that is different from the ones with which the event was generated or received in the system. In such a multiplexing framework, the event recordation system scales to large number of initial topics and initial partitions while using a more restrained number of physical topics and partitions that are effectively used to persist the events in the event recordation system. In these implementations, a pair of topic and partition defines a channel. The multiplexing framework includes multiple levels of channels. A first set of channels is the active channels that are defined based on initial topics and initial partitions. The initial topics and partitions are the topic/partition used by consumers to request the events. These initial topics and initial partitions are also the topics/partitions with which the events are received in the system. For example, consumers can subscribe to an active channel by subscribing to a given pair of initial topic and partition. The multiplexing platform defines a multiplexing framework definition which includes a hierarchy for aggregating channels from one level to another as it will be described in further details with reference to FIG. 2A. The hierarchy starts with the initial channels (for receiving the events to be persisted in the event recordation systems), a set of optional intermediate aggregate channels, and a set of physical aggregate channels that represent the actual physical channels in which the events are physically persisted in a storage medium (which can be a short term or a long-term storage medium).

Thus, the multiplexing framework definition may include code and metadata that defines the number of channels, the number of channels per each level, as well as the paths from an initial channel at an initial level through an optional intermediary aggregated channel to the lowest level, which is the physical aggregated channel.

The presence of aggregated channels at multiple layers in the multiplexing platform can result in the publication of events in multiple layers for different event consumers. Further, event consumption is enabled from multiple layers for different event consumers. Each one of the layers can correspond to a different barriers or access policy, e.g. different external customers may have access (for publication or subscription) to different layers, different storage systems be associated with different layers (e.g., each storage system may receive events from a different layer), different use cases may use different layers, different instances/pods may be associated with different layers, etc. Hierarchical channels allow subscribers to receive streaming events from individual channels/topics or from aggregations of topics.

These multiplexing event recordation platforms improve over previous event recordation platforms as they are not limited by the capacity of the physical channels in terms of the number of topics and partitions that can be supported. The aggregation of the input channels into one or more layered aggregated channels result in the ability to support larger channels than the actual physical channels available in an event recordation system. The multiplexing framework allows multiple entities (e.g., customers, users, organizations, etc.) to share a same set of physical channels of an event recordation system.

When event consumers request events from an event recordation system, having the ability to replay is a key feature for allowing the consumer to have a durable data stream and avoid data loss. A replay request is a request for event stored at an event recordation system in the past that the consumer would like to access. When the system supports the replay feature, in the case of disconnect, the event consumer can request to obtain events that were received prior to or during the disconnect and is able to obtain the data without gaps or loss. In addition, the system needs to be adaptable to changes that may occur in the multiplexed aggregation defined for a given input channel. In some example, the change can be needed to adapt to increasing data being processed, increasing consumers, or increasing sources of the events. This increase in the different elements results in a change in the multiplexed structure and paths that the event takes from input to the physical channels. In this case, the capacity of replay of a system needs to adapt to the changing in the paths that data may have taken towards the physical paths. For example, events may be recorded in a first physical channel through a first intermediary aggregated channel prior to an interruption or reconfiguration and the events are then recorded in a second physical channel through a second intermediary aggregated channel after the interruption or the reconfiguration. In this example, the system receiving replay request may need to obtain data persisted in the first physical channel and data persisted in the second physical channel.

The implementations described herein present methods and systems for enabling replay when a reroute of recordation of the event occurred in a multiplexed event recordation system. The implementations described herein allow for a dynamic adaptability of an event recordation and distribution system to changes in a multiplexing platform supporting the storage of the events in physical aggregate channels. The implementations are adaptable to capacity increases that occur in the system. The capacity increase can be a change in the association between higher layer channels (e.g., org channel) with the physical aggregate channel (e.g., Kafka partition/topic) such that one or more higher layer level is aggregated into a different physical aggregate channel at a given time. The capacity increase can be an addition of a physical aggregate channel to the multiplexing infrastructure, where the added physical aggregate channel is to receive data previously routed to another existing physical channel. The capacity increase can be the routing of a stream of events to an additional event recordation system that is different than the one previously used for the stream of events.

FIG. 1 illustrates a block diagram of an exemplary architecture 100 for enabling replay when a reroute of recordation of the event occurred in a multiplexed event recordation system in accordance with some implementations. Architecture 100 an event recordation and distribution system 101, one or more event consumers 140, and one or more streams of events 150. The stream of events 150 are received from a stream manager (not shown in FIG. 1) that manages the receipt of streams generated by IoT devices, and/or application data source(s). The application data sources may include various applications running on software-as-a-service (SaaS), platform-as-a-service (PaaS) and/or infrastructure-as-a-service (IaaS) infrastructures. The applications can also include other types of distributed or non-distributed applications that produce streams of events. In some implementations, the architecture 100 runs on a distributed system, typically, among a multitude of physical servers coupled through a physical network (not shown).

The IoT devices and application(s) which are sources of the streams of events 150 include software and/or a combination of software and hardware that run on electronic devices. In one implementation, the event can be accessed via an application programming interface (API) that allows sensors, devices, gateways, proxies and other kinds of clients to register data so that data can be ingested from them. Data from the data sources can include events in the form of structured data (e.g. user profiles and the interest graph), unstructured text (e.g. tweets) and semi-structured interaction logs. Examples of events include device logs, clicks on links, impressions of recommendations, numbers of logins on a particular client, server logs, user's identities (sometimes referred to as user handles or user IDs and other times the users' actual names), content posted by a user to a respective feed on a social network service, social graph data, metadata including whether comments are posted in reply to a prior posting, events, news articles, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the event streams input to the system 101 intended to be stored in one of multiple event recordation systems 110A-110K to be consumed, in real-time, pseudo-real time, or on-demand, by one or more event consumers 140.

Each stream of events from the event streams 150 includes one or more events. For example, streams 150 includes events 151A-Z. Each event from the stream includes an initial topic, an initial partition, and one or more additional fields. The additional fields can be referred to as a payload of the event. For example, event 151A has an initial topic 152A, an initial partition 153A, and one or more additional fields 154A. Typically events of a stream may have one of multiple initial partitions and initial topics. Some events may share the same partition and topic. For example, when a partition refers to an organization ID, all events received with that same partition belong to the same organization within a multi-tenant system. Similarly, when the topic is an alphanumerical value entered by a user of the multi-tenant system to be associated with a record, an account, a task, etc., the events of a single stream may have the same topic. Further the topic and partition allow the event consumers to request the events from the stream of events. In some implementations, the events of the stream 150 may have different topics and partitions. In some implementations, a subset of the events from the stream 150 may share the same topic while having different partitions. In some implementations, a subset of the events from the stream 150 may share the same partition while having different topics. Alternatively, in some implementations, a subset of the events from the stream 150 may share the same topic and the same partition.

The event consumers 140, can be software run environments used for gaining insight on the data embedded in the events, for gaining insight on the operations and actions performed in the applications and/or the IoT devices, and/or for gaining insight on the environment controlled or measured by the IoT devices and/or applications. In some implementations, the event consumers can request to obtain the events and process the events to perform one or more of audit, debug and support, forensic and compliance, and/or analytics of the applications and IoT devices. In some implementations, the event consumers 140 may be implemented in a distributed environment, where multiple event consumers can be implemented on one or more servers. The event consumers 140 can be owned and operated by a same entity such as a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). The one or more event consumers 140 can include one or more of the services offered by the cloud computing architecture.

In some implementations, the event consumers 140 may request to access the events by transmitting a request to the event recordation and distribution system 101. For example, the request can be for event(s) with initial topic 152A and partition 153A. In this example, the event consumer 141A requests to obtain events with associated initial topic 152A and partition 153A. In some implementations, the request is for events with an associated initial topic 152A and does not include an identified partition 153A. For example, when the system is a single tenant system and all events are recorded for this single tenant, the request may include only the associated initial topic 152A. In some implementations, the request for the events can include a commit ID. A commit ID of an event represents an identifier of the event that is indicative of the order of storage of the event in a corresponding event recordation system. In some implementations, the commit ID included in the request is an identifier of the latest event received by the event consumer from the system 101. In other implementations, the commit ID included in the request is an identifier of an event that is yet to be received by the event consumer from the system 101. For example, the commit ID can be the ID following the commit ID of the event received at the event consumer from the system 101. Transmitting a request with the commit ID to the system 101, indicates that the event consumer 141A is interested in receiving events with commit ID that were stored in the event recordation system(s) after the event associated with the transmitted commit ID.

In some implementations, the request can be an API call. In some implementations can be a request to subscribe to a channel of events identified by the initial topic and the initial partition.

The event recordation and distribution system 101 includes an event recordation and distribution manager 120, one or more event recordation systems 110A-K, a multiplexing framework definition modifier 132, and a multiplexing framework definition generator 131, and rules 170. The event recordation and distribution system (ERDS) 101 is operative to receive streams of events 150 process them to be stored in one or more event recordation systems 110A-K and respond to requests from one or more event consumers 140 with events based on initial topic and initial partitions for the events.

Figure 2A:
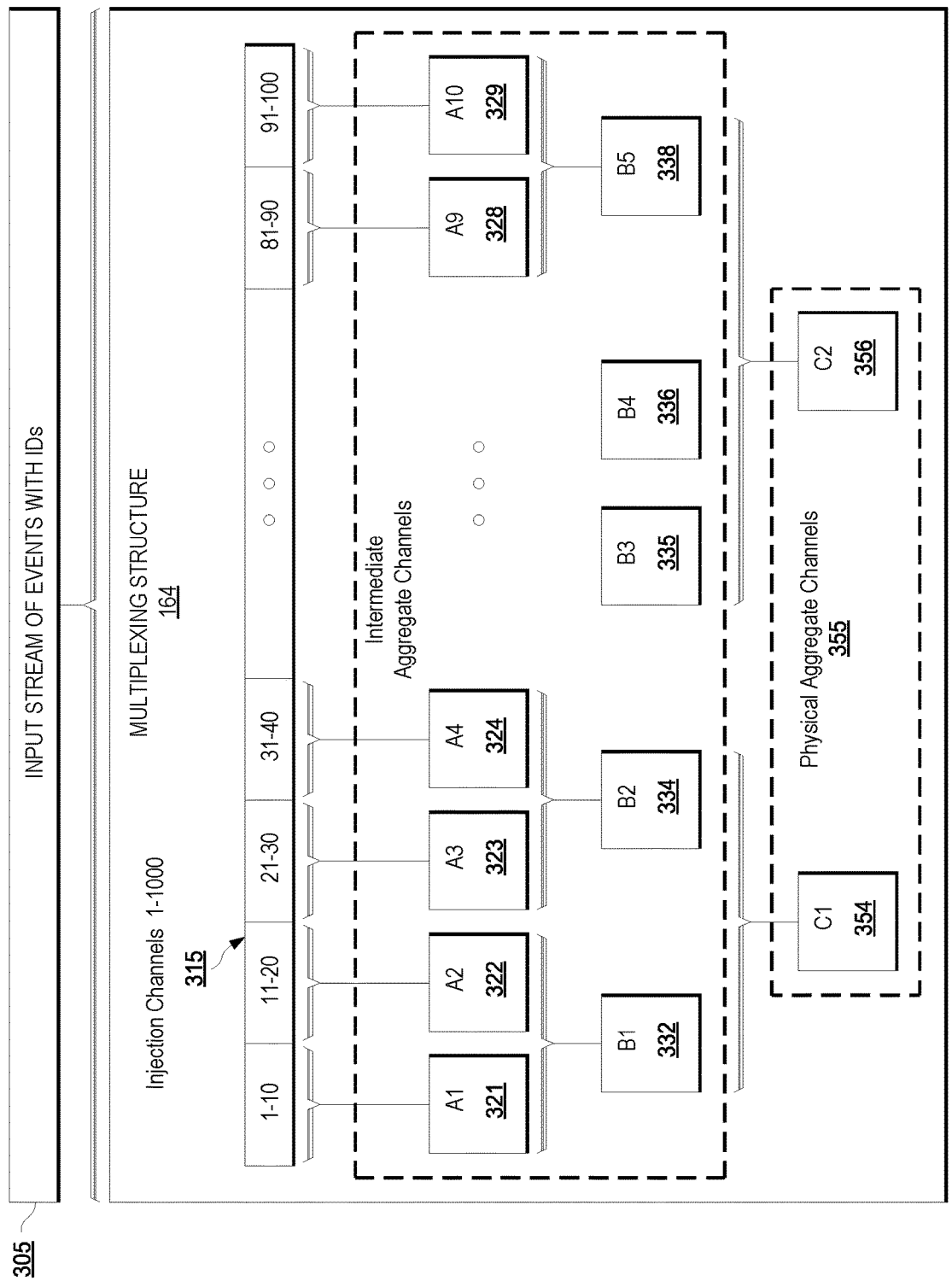
FIG. 2A illustrates a first exemplary multiplexing structure that can be used to route events from injections channels to a physical aggregate channel in accordance with one implementation.

The operations of the ERDS 101 will be described with reference to a first event 151A having initial topic 152A and initial partition 153A and with reference to a first multiplexing structure 164 as illustrated in FIG. 2A. FIG. 2A illustrates an exemplary multiplexing structure that can be used to route events from injections channels (which are the input channels) to a physical aggregate channel from the channels 355 in accordance with one implementation. An input stream of events with IDs 305 enters the event recordation and distribution system 101 through injection channels 315. FIG. 2A illustrates an example with one hundred injection channels 315. In some implementations, the injection channels are identified based on an initial topic and initial partition. In another implementation, the injection channels can be identified based on only one of an initial topic or initial partition. For example, in one implementation, each channel is identified based on an initial topic. Referring back to the example of event 151A, the initial topic 152A and the initial partition 153A identify the channel 100. In these implementations, each event with the same initial topic and initial partition enters the ERDS 101 through the same channel (e.g., channel 100 for all events with the same partition/topic as event 151A). In other implementations, only one of the two topic and partition is used to group events towards the same channel. While the example of FIG. 2A illustrate one hundred channels, this is intended to be exemplary and other numbers of channels, (e.g., several hundreds or thousands of channels) can be included in one or more implementations to service the event consumers 140 of a system.

FIG. 2A illustrates an example configuration with injection channels one through ten multiplexed into intermediate aggregate channel A1 321, injection channels eleven through twenty multiplexed into intermediate aggregate channel A2 322, injection channels twenty-one through thirty multiplexed into intermediate aggregate channel A3 323, injection channels thirty-one through forty multiplexed into intermediate aggregate channel A1 321 and similarly through to injection channels eighty-one through ninety multiplexed into intermediate aggregate channel A9 328 and injection channels ninety-one through one hundred multiplexed into intermediate aggregate channel A10 329. Intermediate aggregate channels A1 321 and A2 322 are multiplexed into intermediate aggregate channel B1 332 and intermediate aggregate channels A3 323 and A4 324 are multiplexed into intermediate aggregate channel B2 334 and similarly through intermediate aggregate channels A9 328 and A10 329 multiplexed into B5 338. Intermediate aggregate channels B1 332 and B2 334 are multiplexed into physical aggregate channel C1 354 and similarly, intermediate aggregate channels B3 335, B4 336 and B5 338 are multiplexed into physical aggregate channel C2 356. That is, in this example, all one hundred channels are multiplexed in physical aggregate channels C1 354 and C2 356, via the three-layer web of channels illustrated in FIG. 2A. In one implementation, each one of the channels is identified based on a topic and partition, or alternatively in other implementations based on a topic only.

Figure 2B:
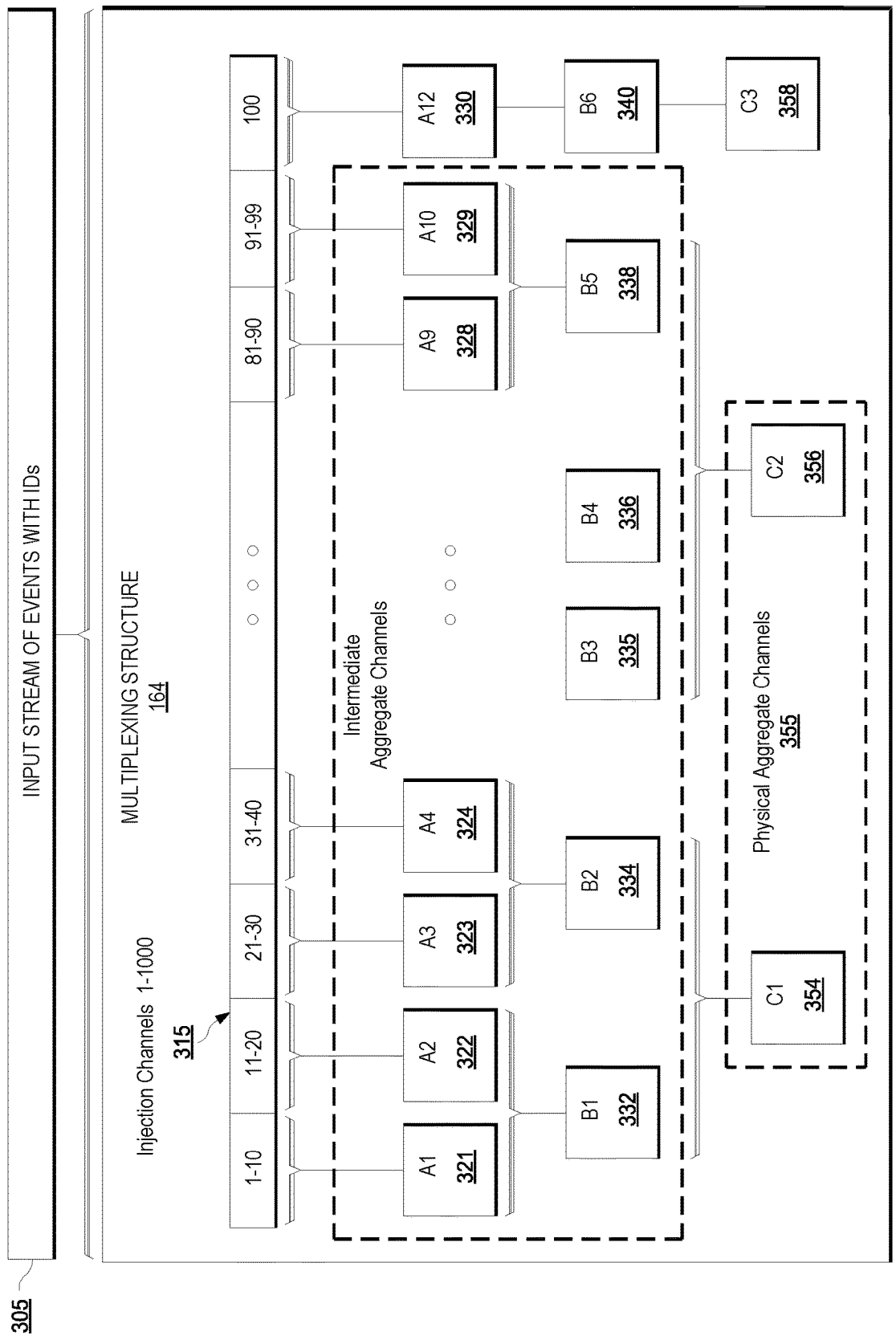
FIG. 2B illustrates a second exemplary multiplexing structure that can be used to route events from injections channels to a physical aggregate channel in accordance with one implementation.
Figure 2C:
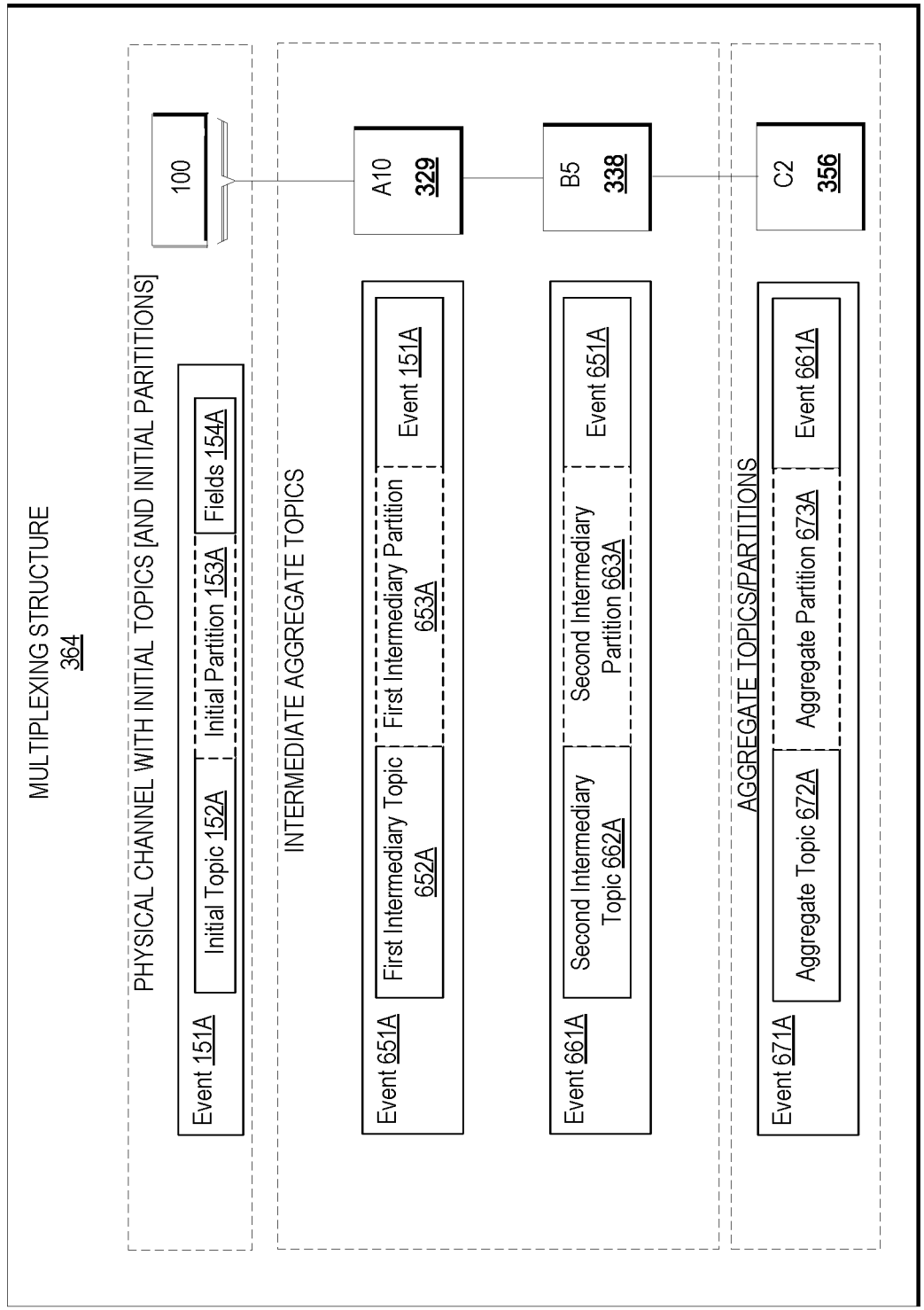
FIG. 2C illustrates an example of topic and partition aggregation from one layer to another layer of the multiplexing structure described with reference to an event, in accordance with one implementation.

When an event is aggregated to a next channel it is encapsulated in a topic and partition that corresponds to the channel to which it is aggregated to. FIG. 2C illustrates an example of topic and partition aggregation from one layer to another layer of the multiplexing structure 364 described with reference to event 151A. For example, if the event 151A includes the initial topic 152A and initial partition 153A in the injection channel 100, it is encapsulated with an intermediary topic 652A and intermediary partition 653A that identify the channel A10 to which the event is aggregated. Similarly, events, e.g., event 651A, that are aggregated from A10 to B5 are encapsulated with a second intermediary topic 662A and second intermediary partition 663A that identify the channel B5. Events, e.g., event 661A, that are aggregated from B5 to C2 are encapsulated with a third topic 672A and third partition 673A that identify the channel C2. These third topic 672A and partition 673A are used by the event recordation and distribution manager 120 to request the event 151A from the event recordation system of first type 110A. The third topic 672A and third partition 673A can be referred to as aggregate topic 672A and aggregate topic 673A.

While the multiplexing structure illustrates a given number of layers, here four layers, in other implementations a different number of layers can be used. For example, the multiplexing structure 164 may include two layers, a first layer including the injection channels, and a second layer including the physical aggregate channels 355. In other implementations, there is at least one intermediary aggregate layer between the first layer of injection channels and the lowest layer of physical aggregate channels 255. Further, while the illustrated multiplexing structure 164 includes 100 injection channels, ten channels of a first intermediary channels A1-A10, five channels of a second intermediary channels B1-B5, and two physical aggregate channels, in other implementations, a different number of channels can be used in each one of the layers.

While the operations will be described with these exemplary events and multiplexing structure, this is intended to be exemplary only and should not be regarded as a limitation of the present implementation. Other types of events or multiplexing structures can be contemplated without departing from the scope of the present invention. In some implementations the initial topic and initial partition identify an initial injection channel from the injection channels 315 of FIG. 2A. In other implementations, a single identifier can be used to identify an injection channel. For example, events may be associated with a single identifier that is used to group events and can be used by event consumers to request streams of events belonging to the same group.

In one implementation, the injection channels and intermediate aggregate channels are logical channels and the terminal aggregate channels are physical channels persisting events in physical storage device. Physical aggregate channels persist events multiplexed from unique channels, in one of the event recordation systems 110A-K. For example, a first storage node C1 persists events in event recordation system 110A while second storage node C2 persists events in event recordation system of second type 110K.

The multiplexing structure 164 is stored as a current multiplexing framework definition 133 in the multiplexing framework definition generator 131. The current multiplexing framework definition 133 is used by the event recordation and distribution manager 120 to determine for each input event from a channel defined based on a given topic and partition the output channel to which this event is to be aggregated. This process is repeated recursively until the event is assigned to a physical aggregate channel and stored in a corresponding event recordation system 110A-K as identified by the physical aggregate channel.

The current multiplexing framework definition 133 indicates the number of layers that form the multiplexing structure, the number of nodes in each layer, and the paths from the injection channels to the lowest layer (i.e., the physical layer including the physical aggregate channels) through the intermediary channels in the intermediary layers. The current multiplexing framework definition 133 includes code and metadata that defines the layers, the channels and the route or path for a given topic/partition. In some implementations, the current multiplexing framework definition 133 is used to determine based on initial input (e.g., initial topic and partition) the path and all of the layers and channels that are to be traversed by the events and return this information to the event recordation and distribution manager 120 to record modified event 171A with a physical aggregation topic (which is also referred to as aggregate topic) and physical aggregation partition (which is also referred to as aggregate partition) to be persisted in event recordation system of first type 110A. In another implementation, the multiplexing framework definition generator 131 is operative to return for a given channel the next channel to which this channel is aggregated. The event recordation and distribution manager 120 then processes this updated channel (with updated encapsulated event) to determine the next (lower) layer in which the event is to be aggregated. This process is repeated until the last call to the multiplexing framework definition generator 131 is made and the output is a physical aggregate channel (e.g., channel C2 for event 151A). Once this mechanism is completed, the event recordation distribution manager 120 transmits the modified event (e.g., event 171A) with new modified topic and partition that correspond to the physical layer to the event recordation system of first type 110A. After the successive encapsulations from one layer to another lower level layer, the modified event is stored in the event recordation system of first type 110A with one or more layer of topics and partitions as defined in the current multiplexing framework definition 133 for that that particular initial topic and initial partition for the event.

In some implementations, the event recordation system of first type 110A is a messaging system that can be used to publish event and transmit events to consumers based on corresponding subscription. In conventional such messaging systems, the topics/partitions used by event producers to publish the events/messages, and the topics/partitions used by the event consumers to subscribe for receiving the events are the same topics/partitions used for storing the events in the messaging system. In the implementations presented herein, the event consumers request events based on the initial topic/partition when these events are stored based on modified topics partitions such that channels of multiple initial topics/partitions are aggregated in a single one of the physical topic/partition used for storing the events.

In the event recordation system of first type 110A the events are grouped with an associated topic and partition (e.g., topic 111A, 112A, 113A). Each event includes an associated commit ID that indicates the identifier of the event when stored in the event recordation system of first type 110A. This commit ID can be used as a confirmation that the event is physically stored in the system. The commit ID indicates the order of storage of a particular event that is associated with the same topic partition as other events. In some implementations, the commit ID is a number that increases from older events to more recent events. In some implementations, the commit ID of the latest event stored for a given pair topic/partition is recorded and available to the event recordation and distribution manager 120. Thus, the events 113A are events recorded/stored in the event recordation system of first type 110A that are ordered based on the time at which they were stored.

In some implementations, the system includes several types of event recordation systems. For example, the system includes an event recordation system of first type 110A and an event recordation system of second type 110K. Each one of the event recordation systems stores data according to a different data structure mechanism. For example, 110A may be a messaging system implemented based on a publish/subscribe platform, and the system 110K can be a long-term storage non-relational database. Alternatively, other types of data structure systems can be used such as relational databases, etc. In some implementations, the event recordation system of first type 110A is a short-term storage medium, where the events have a time to leave associated with them after which they expire, and they are deleted from the system. In some implementations, the system includes an event recordation system type convertor 160 that is operative to convert events stored in an event recordation system of first type 110A to another event recordation system of second type 110K such that the events can be retrieved from either one of the systems. In some implementations, events may be copied from a first event recordation system to another prior to being deleted at the first event recordation system such that they are only available from the event recordation system of second type. In some exemplary implementations, this can be done when the event recordation system of first type is a short-term storage solution and the event recordation system of second type 110K is a long-term storage solution and there is a need for keepings events for a longer period of time than the one supported by the event recordation system of first type 110A.

After recordation of the events at operation 4, an event consumer 140 requests, at operation 5, events with initial topic 152 and initial partition 153A. In this example, the event consumer 141A requests to obtain events with associated initial topic 152A and partition 153A. In some implementations, the request for the events is a request to the event recordation and distribution manager 120 to transmit events received starting the time of receipt of the request. For example, the event consumer 141A subscribes to a channel of events (identified with the initial topic and/or partition) and the event consumer 141A starts receiving any new events that are received at the event recordation and distribution system 101 after the subscription is acknowledged. When responding to the request, the event recordation and distribution manager 120 uses the current multiplexing framework definition 133 to determine the path and different layers associated with the initial topic/partition as received in the request.

In other implementations, the request is a request for events that include historical events (i.e., past events already recorded at the event recordation system(s) prior to the request has been transmitted). This type of requests can be referred to as a replay request. For example, in some implementations, the request for the events can include a commit ID. The commit ID included in the request identifies the latest event received by the event consumer from the system 101. In other implementations, the commit ID included in the request is an identifier of an event that is yet to be received by the event consumer from the system 101. For example, the commit ID can be the ID following the commit ID of the last event received at the event consumer from the system 101. Transmitting a request with the commit ID to the system 101, indicates that the event consumer 141A is interested in receiving events that were stored in the event recordation system(s) after the event associated with the transmitted commit ID. This request may include a request for historical events, which are events stored in the event recordation system during a period of time that precedes the time of receipt of the request by the event recordation and distribution manager 120.

When the recordation of events identified by the initial topic and partition indicated in the request followed the same multiplexing path defined by a same multiplexing framework definition 133 without any changes occurring in the system for the path, the response for the request is performed based on the multiplexing framework definition 133. The event recordation and distribution manager 120 follows a similar multiplexing framework based on the definition 133 to determine the physical aggregated channel where the events are stored and retrieves these events from the physical aggregated based on the commit ID included in the request. The events are then transmitted to the event consumer.

The system is dynamic such that the multiplexing framework definition modifier 132 may modify the current multiplexing framework definition 133 to adapt to changes that occur in the system. The changes can result from a need to increase the capacity of the physical aggregated channels to store additional events and/or to separate injections channels that were previously merged in a single physical aggregated channel into two separate physical channels. The capacity increase can be a change in the association between higher layer channels (e.g., org channel) with the physical aggregate channel such that one or more higher layer level is aggregated into a different physical aggregate channel at a given time. For example, a channel 100 can be routed towards a first intermediate layer that is different from A10 after a given time. The channel 100 can be routed towards the channel A4 resulting in the events being persisted in a physical aggregate channel 354 that is different from the physical aggregate channel 356.

The capacity increase can result from an addition of a physical aggregate channel to the multiplexing infrastructure, where the added physical aggregate channel is to receive data previously routed to another existing physical channel. For example, as illustrated in FIG. 2B, a new physical channel 358 is added to the multiplexing structure and after a given time the injections channels 91-100 are routed through a new path towards the new physical channel. This new physical channel can be located in the same event recordation system as the other channels. For example, channel 354, 356, and 358 can be stored in event recordation system 101A. In other implementations, the new physical channel can be located in another event recordation system different than the other channels. For example, channel 354 and 356 can be stored in event recordation system 101A and channel 358 is stored in event recordation system 101K.

The capacity increase can result in the routing of a stream of events to an additional event recordation system that is different than the one previously used for the stream of events. For example, data previously served from the event recordation system of first type 110A can be served from the same physical aggregated channel, however historical data (that may have expired in the event recordation system of first type 110A) can be retrieved from the event recordation system of second type 110K. Alternatively, data that was previously served from the system 110A is now served from the second system 110K. In these examples, depending on the commit ID of the event that is requested by a consumer, the event recordation and distribution manager 120 may need to retrieve the data either from the first system 110A or from the second system 110Z.

When the route/path changes for a given injection channel in the multiplexing structure, either a new structure is generated (e.g., FIG. 2B) or a new route for that channel is created within that same original structure. When the multiplexing framework definition modifier 132 modifies the current multiplexing framework definition 133 to reflect the route/path change for an injection channel, the new incoming streams of events that are received after the modification are routed based on a new multiplexing framework definition. The previous definition is then no longer used to route any new events received in the system 101. However, this previous definition may be needed for at least a predetermined period of time to allow the event recordation and distribution manager 120 to respond to replay requests.

When the route/path of a given injection channel changes, a rule is created (e.g., rule 172A) in the set of rules 170. The set of rules may include one or more rules 172A-H representative of changes that occurred in the multiplexing framework definition over time. The rule 172A includes a field including a creation date 181A, indicating the date at which the rule was created, field 182A which includes the channel ID affected by the change. For example, when the change affected channel 100, the field 182A includes the initial partition and initial topic identifying this channel. The rule further includes the switch of route commit ID 182A including the commit ID of the event that was last recorded in the event recordation system prior according to the previous multiplexing framework definition prior to the change in route occurred. In some implementations, the commit ID may indicate the first event recorded in the system based on the new multiplexing framework definition. In some other implementations, the commit ID may indicate an event recorded in the system based on the previous multiplexing framework definition that is prior to the last one recorded based on the previous multiplexing framework definition, which will allow the event consumers to obtain overlapping requests when performing a replay request and ensure that no loss of data occurs. The rule further includes the previous destination channel associated with the channel 182A. The previous destination channel is the channel to which the channel 182A was aggregated prior to the occurrence of the route. The rule 172A allows the event recordation and distribution manager 120 to respond to replay requests when a change occurred in a multiplexing framework definition. In some implementations, one or more of the rules are associated with a time to live period, after which the rules expire. In some implementations, the rule expires when the last event associated with the rule is no longer stored in the event recordation system 110A-K. For example, when the event recordation system is a short-term storage system, where each event stored has an associated time to live. The rule is deleted or expires after the last event associated with that rule has been deleted from the system. This results in freeing storage resources for storing the multiple rules as well as reducing the computational burden on the event recordation and distribution manager 120 when processing replay requests as less rules need to be evaluated to respond to the requests.

Once the rule is created, any replay request for events received at the manager 120 is processed based on the rules. A request that is for data that includes historical event with a commit ID (where the commit ID comes before the switch of route commit ID) and span the change (i.e., the resulting data to be received needs to come from old data routed through the previous definition that was in use before the change and from new data routed through the current multiplexing framework definition that is in use since the change occurred), is processed based on the rules 170 and the current definition 133.

In some implementations, the manager 120 upon receipt of the request and the commit ID for a given initial partition/topic determines at each transition from a first layer to another layer whether a rule should be applied to the event by comparing the commit ID received from the event consumer with the commit ID stored in the rule. If the commit ID received in the request is smaller than the switch route commit ID, the rule applies, and the destination of the channel is the previous destination 184A stored in the rule. Alternatively, if the commit ID received in the request is greater than the switch route commit ID, the rule does not apply and instead the event is to be routed based on the multiplexing framework definition 133. In some implementations, the rule is used to determine a global previous path for the initial topic and initial partition up to the physical aggregated layer. In other implementations, the rule is used at each layer to determine the destination channel in the layer below.

The system and method described herein allow the recordation system to add more partitions in a way that is entirely transparent to the event consumers and which is based on intelligent runtime routing. For example, new consumers can be routed to newly added partitions, and newly inserted events can be routed to the new partitions without any interruption or delay. On the consumptions side, older events from previous partitions can be delivered without loss of data and in a transparent manner in response to replay requests. Once the system has caught up to the commit ID associated with the new routing, the system can intelligently switch the routing to a different mux-channel to start getting events from the new partitions.

These intelligent and flexible multiplexing and routings are efficient and advantageous with respect to previous event recordation and distribution systems. The system uses a schema enveloping (encapsulation) mechanism on the events on their way in to the system. Each time an event passes through one layer to another, the event is added with the corresponding schema (topic/partition). Therefore, the event itself carries enough metadata to allow the system to calculate where to route it both on its way in (e.g., when published) and out (e.g., when requested). Additionally, the manager 120 uses these metadata to compute the runtime dynamic route.

Figure 3A:
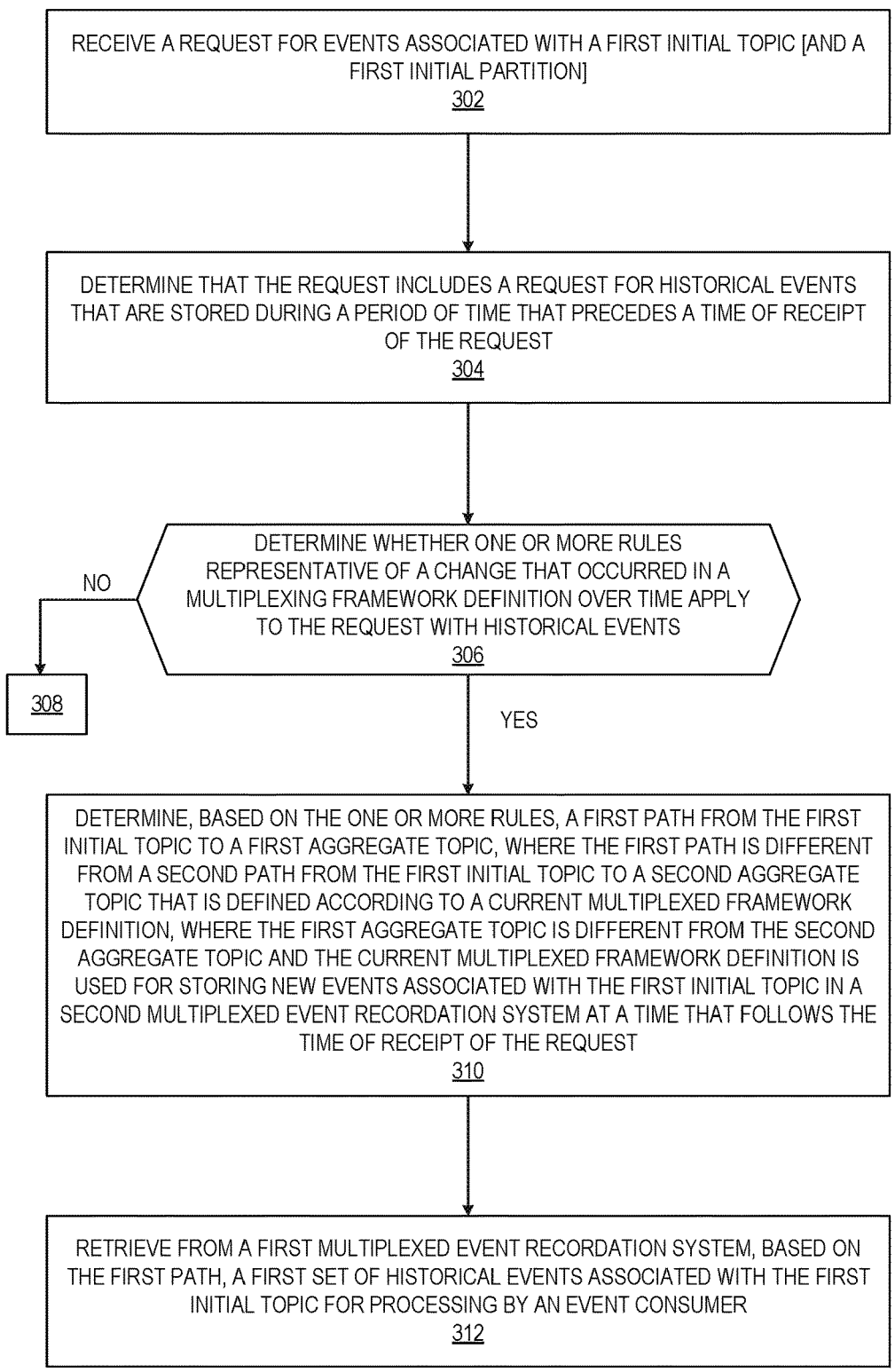
FIG. 3A illustrates a flow diagram of exemplary operations for enabling replay of events when a reroute of recordation of events associated with an initial topic occurred in a multiplexed event recordation system, in accordance with some implementations.
Figure 3B:
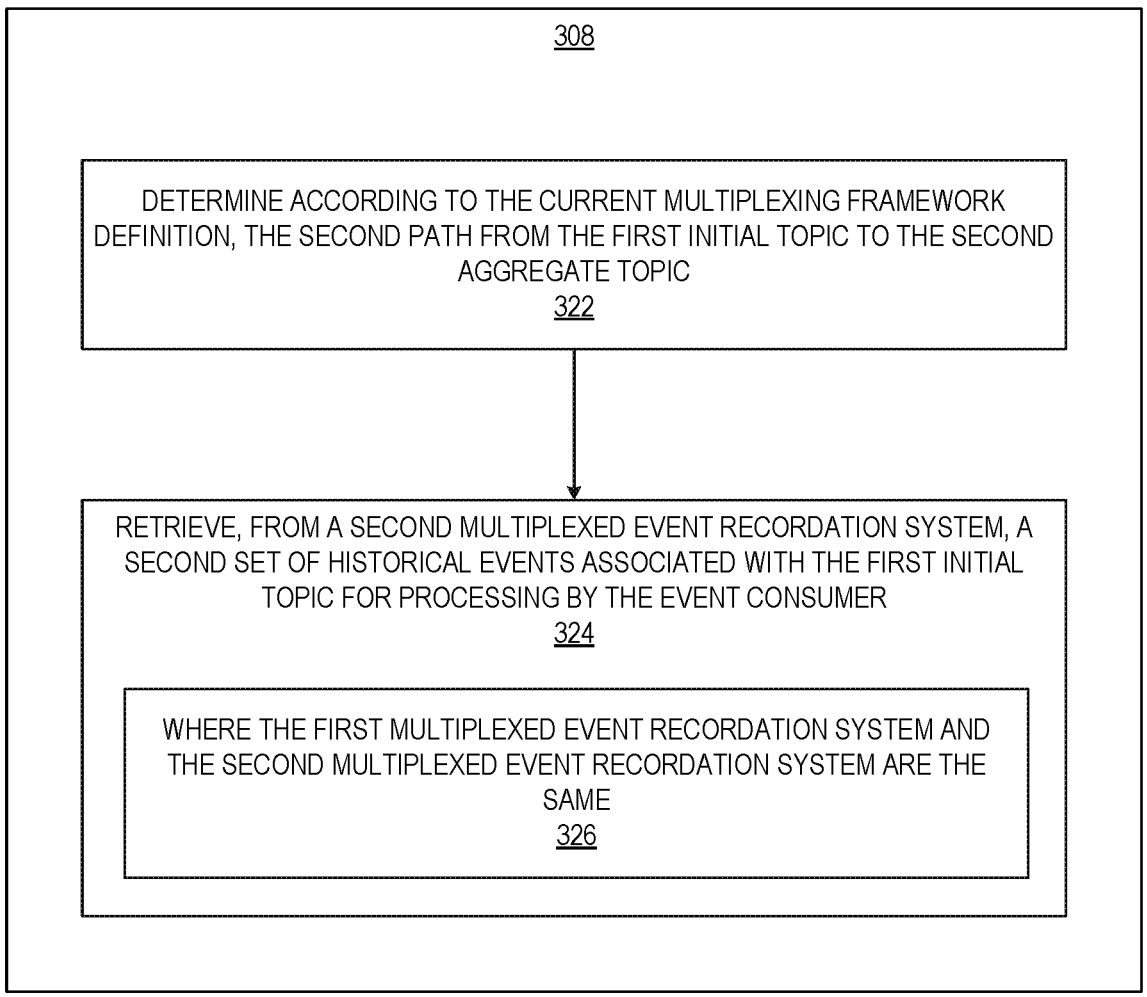
FIG. 3B illustrates a flow diagram of exemplary operations for responding to a request when the set of rules does not apply to the request for the historical events, in accordance with some implementations.
Figure 3C:
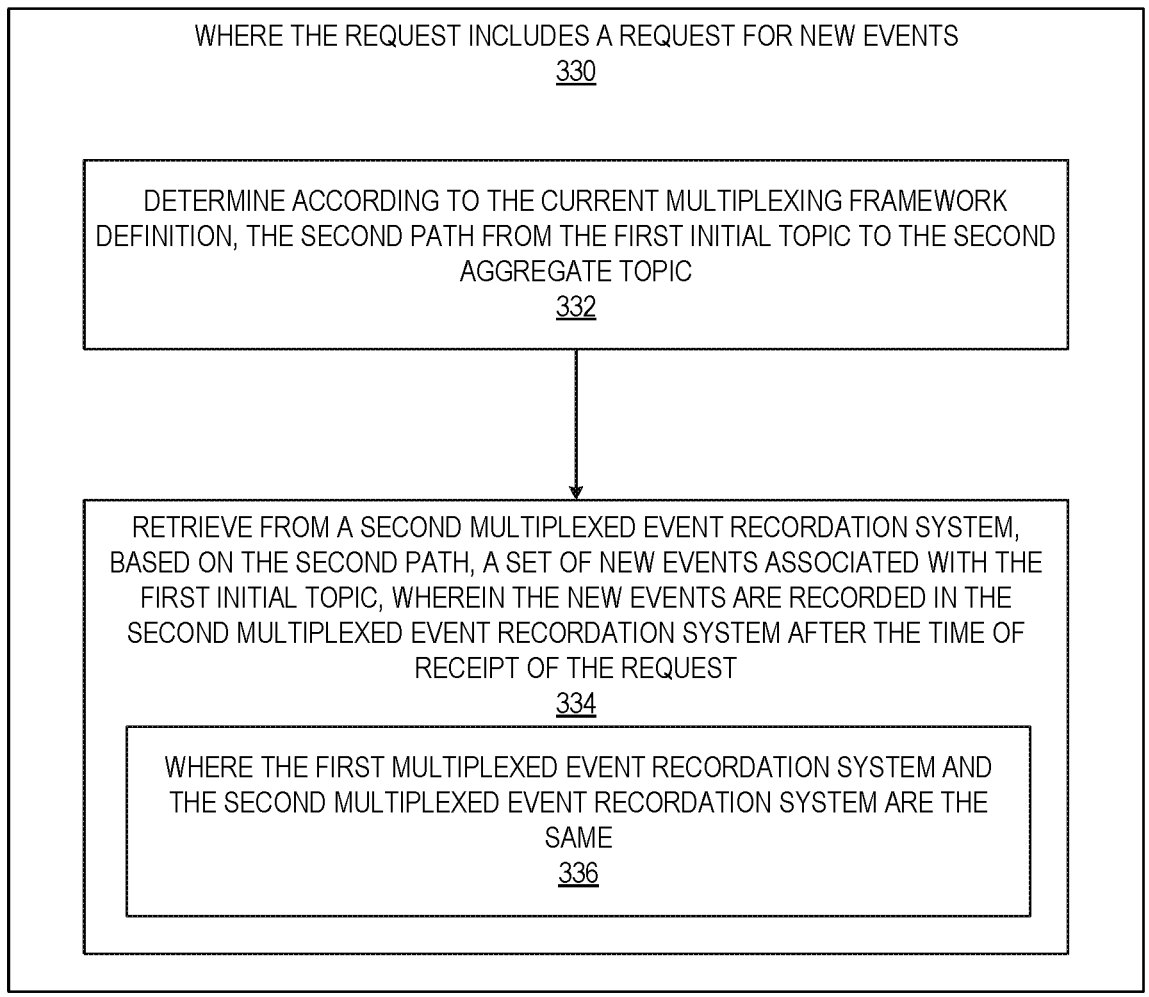
FIG. 3C illustrates a flow diagram of exemplary operations performed when the request further includes a request for new events, in accordance with some implementations.

The operations in the flow diagrams of FIGS. 3A-C are described with reference to the exemplary implementations in FIGS. 1-2C. However, the operations of the flow diagrams can be performed by implementations other than those discussed with reference to FIGS. 1-2C, and the implementations discussed with reference to these other figures can perform operations different than those discussed with reference to the flow diagrams.

FIG. 3A illustrates a flow diagram of exemplary operations for enabling replay of events when a reroute of recordation of events associated with an initial topic occurred in a multiplexed event recordation system, in accordance with some implementations. In some implementations, the operations of FIG. 3A are performed by an event recordation and distribution system 101. In particular, the operations can be performed by the event recordation and distribution manager 120. In other implementations, other systems can implement the operations of FIG. 3A without departing from the scope of the present implementations.

In the event recordation and distribution system 101, each event is associated with one of multiple initial topics. In some implementations the events are further associated with respective partitions (e.g., partition 153A for event 151A). The events are stored in a multiplexed event recordation system (e.g., at least one of 110A and 110K) according to a multiplexing framework definition (e.g., 133) that defines a path from the initial topic to an aggregate topic. The aggregate topic (e.g., aggregate topic 672A) is used for storing the event in the multiplexed event recordation system. In other words, the aggregate topic is the topic used in the physical storage device for storing the events. Multiple events respectively associated with at least two different initial topics are stored in the multiplexed event recordation system according to the aggregate topic. For example, as illustrated with respect to FIGS. 2A-B, events with different initial topics (1-10) are stored according to a single aggregate topic in physical aggregate channel C1.

At operation 302, a request for events associated with a first initial topic is received in the system 101. In some implementations, the request is a request to subscribe to the first initial topic to receive events associated with the first initial topic. For example, the request can be a request to subscribe to a channel of events identified by the initial topic and the initial partition. In some implementations, the request can be an API call.

At operation 304, the event recordation and distribution manager 120 determines that the request includes a request for historical events that are stored during a period of time that precedes a time of receipt of the request. This type of requests can be referred to as a replay request. The historical events are past events already recorded in an event recordation system prior to the receipt of request. In some implementations, the request for the events can include a commit identifier (commit ID). In one implementation, the commit ID included in the request identifies the latest event received by the event consumer from the system 101. In another implementation, the commit ID included in the request is an identifier of an event that is yet to be received by the event consumer from the system 101. For example, the commit ID can be the ID following the commit ID of the last event received at the event consumer from the system 101. When the system receives a request including a commit ID, this indicates that the event consumer 141A is interested in receiving events that were stored in the event recordation system(s) starting with or after the event associated with the transmitted commit ID.

Responsive to determining that the request includes a request for historical events, the event recordation and distribution manager 120 determines, at operation 306, whether one or more rules representative of a change that occurred in a multiplexing framework definition over time apply to the request with historical events. In some implementations, each rule from the rules includes a creation date (e.g., 181A) indicating the date at which the rule was created, an initial topic (182A), a previous destination topic (184A) associated with the initial topic, and a switch of path/route commit identifier (183A) identifying the event that was last stored in an event recordation system according to a previous multiplexing framework definition prior to occurrence of a change for events associated with the initial topic. The switch of path commit identifier (which can be referred to as the switch commit ID) can be the commit ID of the event that was last recorded in the event recordation system according to the previous multiplexing framework definition prior to the occurrence in a change in route for the first initial topic. In some implementations, the switch of path commit ID may indicate the first event recorded in the system based on a new multiplexing framework definition. In some other implementations, the switch of path commit ID may indicate an event recorded in the system based on a previous multiplexing framework definition that is before the commit ID of to the last event recorded based on the previous multiplexing framework definition. This commit ID allows the event consumers to obtain overlapping events when performing a replay request and to ensure that no loss of data occurs. The rule may further include the previous destination channel associated with the first initial topic. The previous destination channel is the channel to which the first initial topic was aggregated prior to the occurrence of a change in path for the first initial topic. In other implementations less or more fields can be included in each rule without departing from the scope of the present implementations.

The rule allows the event recordation and distribution manager 120 to respond to replay requests when a change occurred in a multiplexing framework definition. In some implementations, one or more of the rules are associated with a time to live period, after which the rules expire. In some implementations, a rule expires when the last event associated with the rule is no longer stored in one of the event recordation system 110A-K. For example, when the event recordation system is a short-term storage system, where each event stored has an associated time to live. The rule is deleted or expires after the last event associated with that rule has been deleted from the system. This results in freeing storage resources for storing the multiple rules as well as reducing the computational burden on the event recordation and distribution manager 120 when processing replay requests as less rules need to be evaluated to respond to the requests.

In some implementations, determining that the rule applies is performed based on the commit identifier that is indicative of the order of storage of an event in a multiplexed event recordation system. The determination that the rule applies can include comparing the commit ID received in the request with a first switch of path commit identifier (e.g., 183A) stored in a first rule from the rules (e.g., rule 172A from rules 170); and determining that the commit identifier received in the request is smaller than the first switch of path commit identifier. In some implementations, the commit ID is an identifier of the latest event processed by the event consumer 141A prior to transmitting the request. In some implementations, the commit identifier is an identifier of an event that is yet to be processed by the event consumer 141A.

Responsive to determining that the one or more rules apply to the request for historical events, the flow of operations moves to operations 310-312. At operation 310, the event recordation and distribution manager 120 determines, based on the rules 170, a first path from the first initial topic to a first aggregate topic, where the first path is different from a second path from the first initial topic to a second aggregate topic that is defined according to a current multiplexed framework definition 133. The first aggregate topic is different from the second aggregate topic and the current multiplexed framework definition (e.g., 133) is used for storing new events associated with the first initial topic in a second multiplexed event recordation system at a time that follows the time of receipt of the request.

Referring to the non-limiting example of FIGS. 2A and 2B, the first path can be the path from the first initial topic associated with the injection channel 100 to the first aggregate channel C2 identified with the first aggregate topic. The second path can be the path from the first initial topic associated with the injection channel 100 to the second aggregate channel C3 identified with a second aggregate topic. Thus, a change occurred in the system such that the events of a channel 100 are routed differently and stored in two different physical aggregate channels identified based on two different aggregate topics.

While the implementations describe rules used to determine a path from an initial topic to an aggregate topic, in some implementation each rule can be used to determine a path from a first channel in a first layer (e.g., identified based on an initial topic or an intermediate topic) to another channel in another layer below the first layer (e.g., that is identified based on an intermediate topic or an aggregate topic).

The flow of operations then moves to operation 312, at which the event recordation and distribution manager 120 retrieves from a first multiplexed event recordation system (e.g., 110A), based on the first path, a first set of historical events associated with the first initial topic for processing by an event consumer.

In some implementations, a request that is for data that includes historical events with a commit ID (where the commit ID comes before the switch of route commit ID) and span the change (i.e., the resulting data to be received needs to come from old data routed through the previous definition (e.g., FIG. 2A) that was in use before the change and from new data routed through the current multiplexing framework definition (e.g., FIG. 2B) that is in use since the change occurred) is processed based on the rules 170 and the current multiplexing framework definition 133.

In some implementations, there was no change in the routing of the events from initial topics to aggregate topics. In these implementations, responsive to determining that none of the rules 170 apply to the request for the historical events, the flow of operations moves to operation 308, which is described in further details with reference to FIG. 3B. FIG. 3B illustrates a flow diagram of exemplary operations for responding to a request when the set of rules does not apply to the request for the historical events, in accordance with some implementations. When it is determined that the rules don't apply to the historical events, i.e., that there was no change in the path from the first initial topic to the aggregate topic, the events are retrieved based on the current multiplexing framework definition 133. At operation 322, the event recordation and distribution manager 120 determines according to the current multiplexing framework definition 133, the second path from the first initial topic to the second aggregate topic, and retrieves at operation 324, from a second multiplexed event recordation system, a second set of historical events associated with the first initial topic for processing by the event consumer. Thus, when there is no change in the routing of events from the first initial topic to an aggregate topic, the historical events and the new events associated with the first initial topic are retrieved based on the same current multiplexing framework definition 133.

FIG. 3C illustrates a flow diagram of exemplary operations performed when the request further includes a request for new events, in accordance with some implementations. In some implementations, in addition to a request for the historical events, the request received is also for any events newly recorded in the event recordation system(s) that is associated with the initial topic. For example, when the request is a replay request it may also include a request for events that are recorded in the event recordation system(s) after receipt of the request. In some implementations, the request is a subscription to the initial topic and includes a commit identifier. The commit identifier indicates the identifier from which publication of the events is to start. In these implementations, the event recordation and distribution manager 120 determines, at operation 332, according to the current multiplexing framework definition 133, the second path from the first initial topic to the second aggregate topic. At operation 334, the event recordation and distribution manager 120 retrieves from a second multiplexed event recordation system, based on the second path, a set of new events associated with the first initial topic. The new events are recorded in the second multiplexed event recordation system after the time of receipt of the request.

In some implementations, the request for the events is a request to the event recordation and distribution manager 120 to transmit events received starting the time of receipt of the request. For example, the event consumer 141A subscribes to a channel of events (identified with the initial topic and/or initial partition) and the event consumer 141A starts receiving any new events that are received at the event recordation and distribution system 101 after the subscription is acknowledged. When responding to the request, the event recordation and distribution manager 120 uses the current multiplexing framework definition 133 to determine the path and different layers associated with the initial topic/partition as received in the request.

In some implementations, a request, which includes a request for historical events (e.g., a request with a commit identifier (commit ID), where the commit ID indicates an event that was recorded in the event recordation system(s) before a switch of path for an initial topic, (i.e., the commit ID of the request is before the switch commit ID)) and a request for new events, is processed based on the rules 170 and the current multiplexing framework definition 133. This request spans at least one change that occurred in the path from the initial topic to an aggregate topic such that prior to a given time the events associated with the first initial topic are first stored according to a first path from the first initial topic to a first aggregate topic of a first recordation system and following that given time the events associated with the first initial topic are stored according to a second path from the first initial topic to a second aggregate topic of a second recordation system. Thus, the first path results from a previous definition that was in use before the change occurred and the second path results from the current multiplexing framework definition 133 that is in use since the change occurred. The first path is defined based on the rules 170 and the second path is defined based on the current multiplexing framework definition 133. The first and second aggregate topics are different topics. While in some implementations, the first recordation system and the second recordation system can be the same, in other implementations, the first recordation system and the second recordation system are different systems. In some implementations, the first multiplexed event recordation system and the second multiplexed event recordation system are the same. In other words, the historical events can be stored in the same system as the new events received to the system. Alternatively, the first multiplexed event recordation system and the second multiplexed event recordation system are different. In other words, the historical events are not stored in the same system as the new events received to the system.

While some implementations herein are described with respect to paths and channels associated with topics, in other implementations, the paths and channels are identified with a topic and a partition. In some implementations, the initial partition is an organization identifier (org ID) that uniquely identifies a tenant in multi-tenant system. In some implementations, the aggregate topics and aggregate partitions are topics and partitions used to store and retrieve events from a physical storage system.

While the implementations herein are described with respect to a single change that occurred in the path from an initial topic to an aggregate topic when a request for historical data is received, in other implementations, there may be several changes of the path that occurred and the response to the request for historical data can be performed based on several rules that identify the change and the previous paths of the events.

The implementations described herein present methods and systems for enabling replay when a reroute of recordation of the event occurred in a multiplexed event recordation system. The implementations described herein allow for a dynamic adaptability of an event recordation and distribution system to changes in a multiplexing platform supporting the storage of the events in physical aggregate channels based on aggregate topics. The implementations are adaptable to capacity increases that occur in the system. The capacity increase can be a change in the association between higher layer channels (e.g., org channel) with the physical aggregate channel (e.g., Kafka partition/topic) such that one or more higher layer level is aggregated into a different physical aggregate channel at a given time. The capacity increase can be an addition of a physical aggregate channel to the multiplexing infrastructure, where the added physical aggregate channel is to receive data previously routed to another existing physical channel. The capacity increase can be the routing of a stream of events to an additional event recordation system that is different than the one previously used for the stream of events.

General Architecture:

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
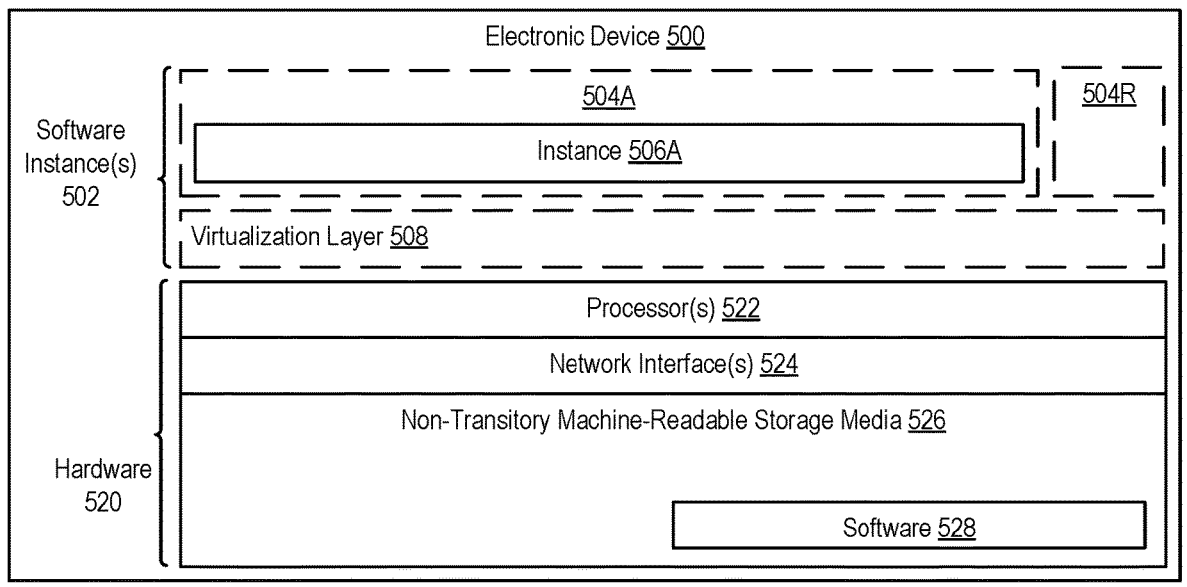
FIG. 4A is a block diagram illustrating an electronic device according to some example implementations.

FIG. 4A is a block diagram illustrating an electronic device 500 according to some example implementations. FIG. 4A includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described event consumers 140, event recordation systems 110A-K, event recordation and distribution manager 120, event recordation system type convertor 160, multiplexing framework definition generator 131, multiplexing framework definition modifier 132, and rules 170 may be implemented in one or more electronic devices 500. In one implementation, each of the previously described event consumers 140, event recordation systems 110A-K, event recordation and distribution manager 120, event recordation system type convertor 160, multiplexing framework definition generator 131, multiplexing framework definition modifier 132, and rules 170 are implemented in a separate set of one or more of the electronic devices 500 (e.g., a set of one or more server electronic devices where the software 528 represents the software to implement each one of the event consumers 140, event recordation systems 110A-K, event recordation and distribution manager 120, event recordation system type convertor 160, multiplexing framework definition generator 131, multiplexing framework definition modifier 132, or rules 170); and in operation, the electronic devices implementing these components would be communicatively coupled (e.g., by a network) and would establish between them (or through one or more other layers) connections. Other configurations of electronic devices may be used in other implementations (e.g., two or more of the event consumers 140, event recordation systems 110A-K, event recordation and distribution manager 120, event recordation system type convertor 160, multiplexing framework definition generator 131, multiplexing framework definition modifier 132, and rules 170 can be implemented on a single electronic device 500).

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Figure 4B:
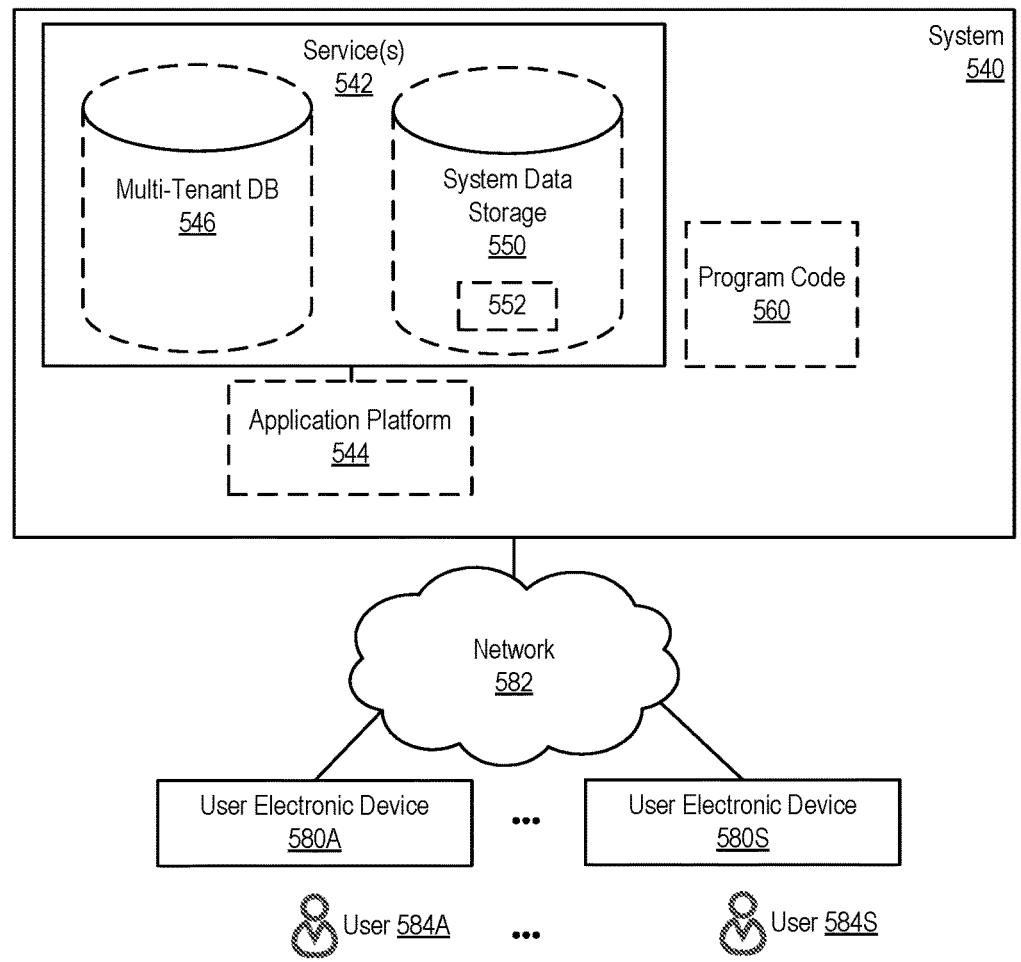
FIG. 4B is a block diagram of an environment where a mechanism for event replay when a reroute of recordation of the event occurred in a multiplexed event recordation system may be deployed, according to some implementations.

FIG. 4B is a block diagram of an environment where a tokenizer and log record consumers may be deployed, according to some implementations. A system 540 includes hardware (a set of one or more electronic devices) and software to provide service(s) 542, including the log consumers and/or the tokenizer. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communicate with each other and/or with one or more of the user electronic devices 580A-S via one or more Application Programming Interface(s) (APIs) (e.g., a Representational State Transfer (REST) API). The user electronic devices 580A-S are operated by users 584A-S.

In one implementation, the system 540 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546, as well as system data storage 550 for system data 552 accessible to system 540. In some implementations, each of the event recordation systems 110A-K can be a multi-tenant database. In certain implementations, the system 540 includes a set of one or more servers that are running on server electronic devices and that are configured to handle requests for any authorized user associated with any tenant (there is no server affinity for a user and/or tenant to a specific server). The user electronic device 580A-S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for enabling event consumption, wherein each event is associated with one of a plurality of initial topics and is stored in a multiplexed event recordation system according to a multiplexing framework definition that defines a path from the initial topic to an aggregate topic, wherein the aggregate topic is used for storing the event in the multiplexed event recordation system, and wherein events respectively associated with at least two different initial topics are stored in the multiplexed event recordation system according to the aggregate topic, the method comprising:

receiving a request for a first set of stored historical events associated with a first initial topic that occurred during a first time period in the past;

selecting, based on the request, one or more rules that will be used to retrieve, according to a previous multiplexing framework definition, a second set of stored historical events associated with the first initial topic that occurred during a second time period in the past, wherein the second time period is at least part of the first time period, wherein the one or more rules define a first path from the first initial topic to a first aggregate topic, wherein the first path is different from a second path from the first initial topic to a second aggregate topic that is defined according to of a current multiplexing framework definition that is used for storing new events associated with the first initial topic in a first multiplexed event recordation system at a time that follows the time of receipt of the request, and wherein the previous and current multiplexed frame definitions respectively define a first and second hierarchy for aggregating channels of events;

responsive to selecting the one or more rules based on the request, performing the following:

determining, based on the one or more rules, the first path; and retrieving from a second multiplexed event recordation system, based on the first path, the second set of stored historical events for processing by an event consumer.

2. The method of claim 1 further comprising:

responsive to determining that the one or more rules do not apply to the request, performing the following:

determining according to the current multiplexing framework definition, the second path from the first initial topic to the second aggregate topic, and retrieving, from the first multiplexed event recordation system, a third set of historical events associated with the first initial topic for processing by the event consumer.

3. The method of claim 1, wherein the request includes a request for new events and the method further comprises:
determining according to the current multiplexing framework definition, the second path from the first initial topic to the second aggregate topic; and
retrieving from the first multiplexed event recordation system, based on the second path, a set of new events associated with the first initial topic, wherein the new events are recorded in the first multiplexed event recordation system after the time of receipt of the request.

4. The method of claim 1, wherein the request includes a commit identifier that is indicative of an order of storage of an event in a multiplexed event recordation system; and wherein determining whether the one or more rules apply is performed based on the commit identifier.

5. The method of claim 4, wherein the commit identifier is an identifier of the latest event processed by the event consumer.

6. The method of claim 4, wherein the commit identifier is an identifier of an event that is yet to be processed by the event consumer.

7. The method of claim 1, wherein each rule from the one or more rules includes a creation date indicating a date at which the rule was created, an initial topic, a previous destination topic associated with the initial topic, and a switch of path commit identifier identifying the event that was last stored in an event recordation system according to the previous multiplexing framework definition prior to occurrence of a change for events associated with the initial topic.

8. The method of claim 7, wherein determining that the rule applies includes:
comparing the commit identifier received in the request with a first switch of path commit identifier stored in a first rule from the one or more rules; and
determining that the commit identifier received in the request is smaller than the first switch of path commit identifier.

9. The method of claim 1, wherein the request is a request to subscribe to the first initial topic to receive events associated with the first initial topic.

10. A non-transitory machine-readable storage medium that provides instructions for enabling event consumption from an multiplexed event recordation system, wherein each event is associated with one of a plurality of initial topics and is stored in the multiplexed event recordation system based on a multiplexing framework definition that defines a path from the initial topic to an aggregate topic that is used for storing the event in a multiplexed event recordation system, and wherein events respectively associated with at least two different initial topics are stored in the multiplexed event recordation system according to the aggregate topic, and the instructions, when executed by a processor, cause said processor to perform operations comprising:
receiving a request for a first set of stored historical events associated with a first initial topic that occurred during a first time period in the past;
selecting, based on the request, one or more rules that will be used to retrieve, according to a previous multiplexing framework definition, a second set of stored historical events associated with the first initial topic that occurred during a second time period in the past, wherein the second time period is at least part of the first time period, wherein the one or more rules define a first path from the first initial topic to a first aggregate topic, wherein the first path is different from a second path from the first initial topic to a second aggregate topic that is defined according to a current multiplexing framework definition that is used for storing new events associated with the first initial topic in a first multiplexed event recordation system at a time that follows the time of receipt of the request, and wherein the previous and current multiplexed frame definitions respectively define a first and second hierarchy for aggregating channels of events;
responsive to selecting the one or more rules based on the request, performing the following:
determining, based on the one or more rules, the first path and
retrieving from a second multiplexed event recordation system, based on the first path, the second set of stored historical events for processing by an event consumer.

11. The non-transitory machine-readable storage medium of claim 10, wherein the operations further comprise:
responsive to determining that the one or more rules do not apply to the request, performing the following:
determining according to the current multiplexing framework definition, the second path from the first initial topic to the second aggregate topic, and
retrieving, from the first multiplexed event recordation system, a third set of historical events associated with the first initial topic for processing by the event consumer.

12. The non-transitory machine-readable storage medium of claim 10, wherein the request includes a request for new events and the operations further comprise:
determining according to the current multiplexing framework definition, the second path from the first initial topic to the second aggregate topic; and
retrieving from the first multiplexed event recordation system, based on the second path, a set of new events associated with the first initial topic, wherein the new events are recorded in the first multiplexed event recordation system after the time of receipt of the request.

13. The non-transitory machine-readable storage medium of claim 10, wherein the request includes a commit identifier that is indicative of an order of storage of an event in a multiplexed event recordation system; and wherein determining whether the one or more rules apply is performed based on the commit identifier.

14. The non-transitory machine-readable storage medium of claim 13, wherein the commit identifier is an identifier of the latest event processed by the event consumer.

15. The non-transitory machine-readable storage medium of claim 13, wherein the commit identifier is an identifier of an event that is yet to be processed by the event consumer.

16. The non-transitory machine-readable storage medium of claim 10, wherein each rule from the one or more rules includes a creation date indicating a date at which the rule was created, an initial topic, a previous destination topic associated with the initial topic, and a switch of path commit identifier identifying the event that was last stored in an event recordation system according to the previous multiplexing framework definition prior to occurrence of a change for events associated with the initial topic.

17. The non-transitory machine-readable storage medium of claim 16, wherein determining that the one or more rules apply includes:

comparing the commit identifier received in the request with a first switch of path commit identifier stored in a first rule from the one or more rules; and determining that the commit identifier received in the request is smaller than the first switch of path commit identifier.

18. The non-transitory machine-readable storage medium of claim 10, wherein the request is a request to subscribe to the first initial topic to receive events associated with the first initial topic.

\* \* \* \* \*